US009357030B2

(12) United States Patent
Aviles et al.

(10) Patent No.: US 9,357,030 B2
(45) Date of Patent: May 31, 2016

(54) CLUSTERED CACHE APPLIANCE SYSTEM AND METHODOLOGY

(71) Applicant: NetApp, Inc., Sunnyvale, CA (US)

(72) Inventors: Joaquin J. Aviles, Austin, TX (US); Mark U. Cree, Austin, TX (US); Gregory A. Dahl, Austin, TX (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/815,637

(22) Filed: Jul. 31, 2015

(65) Prior Publication Data

US 2016/0036938 A1 Feb. 4, 2016

Related U.S. Application Data

(63) Continuation of application No. 12/015,216, filed on Jan. 16, 2008, now Pat. No. 9,130,968.

(51) Int. Cl.
| | |
|---|---|
| *G06F 12/00* | (2006.01) |
| *G06F 13/00* | (2006.01) |
| *G06F 13/28* | (2006.01) |
| *H04L 29/08* | (2006.01) |
| *H04L 29/06* | (2006.01) |
| *G06F 3/06* | (2006.01) |

(52) U.S. Cl.
CPC ........ *H04L 67/2852* (2013.01); *H04L 67/1097* (2013.01); *H04L 67/28* (2013.01); *H04L 69/16* (2013.01); *G06F 3/067* (2013.01); *G06F 3/0611* (2013.01); *G06F 3/0656* (2013.01)

(58) Field of Classification Search
CPC .. H04L 67/1097; H04L 67/2852; H04L 69/16
USPC ........................................................ 711/122
See application file for complete search history.

(56) References Cited

U.S. PATENT DOCUMENTS

| | | | |
|---|---|---|---|
| 7,330,908 B2 * | 2/2008 | Jungck | H04L 29/12066 370/236.1 |
| 2002/0078135 A1 * | 6/2002 | Venkatsubra | H04L 63/08 709/202 |

OTHER PUBLICATIONS

"The Practical Handbook of Internet Computing" (Munindar P. Singh, 2005, Chapman & Hall/CRC, pp. 40-5 to 40-7).*

* cited by examiner

*Primary Examiner* — Charles Rones
*Assistant Examiner* — Sidney Li
(74) *Attorney, Agent, or Firm* — Mahamedi Paradice LLP (57) ABSTRACT

A method, system and program are disclosed for accelerating data storage by providing non-disruptive storage caching using clustered cache appliances with packet inspection intelligence. A cache appliance cluster that transparently monitors NFS and CIFS traffic between clients and NAS subsystems and caches files using dynamically adjustable cache policies provides low-latency access and redundancy in responding to both read and write requests for cached files, thereby improving access time to the data stored on the disk-based NAS filer (group).

20 Claims, 7 Drawing Sheets

CLUSTERED CACHE APPLIANCE SYSTEM AND METHODOLOGY

CROSS-REFERENCE TO RELATED APPLICATIONS

This application is a Continuation of U.S. patent application Ser. No. 12/015,216, filed Jan. 16, 2008, entitled CLUSTERED CACHE APPLIANCE SYSTEM AND METHODOLOGY; the aforementioned priority application being hereby incorporated by reference in its entirety for all purposes.

BACKGROUND OF THE INVENTION

1. Field of the Invention

The present invention is directed in general to the field of computer storage networks. In one aspect, the present invention relates to a standalone cache memory device which is connected between one or more host machines and a storage device.

2. Description of the Related Art

Figure 1:
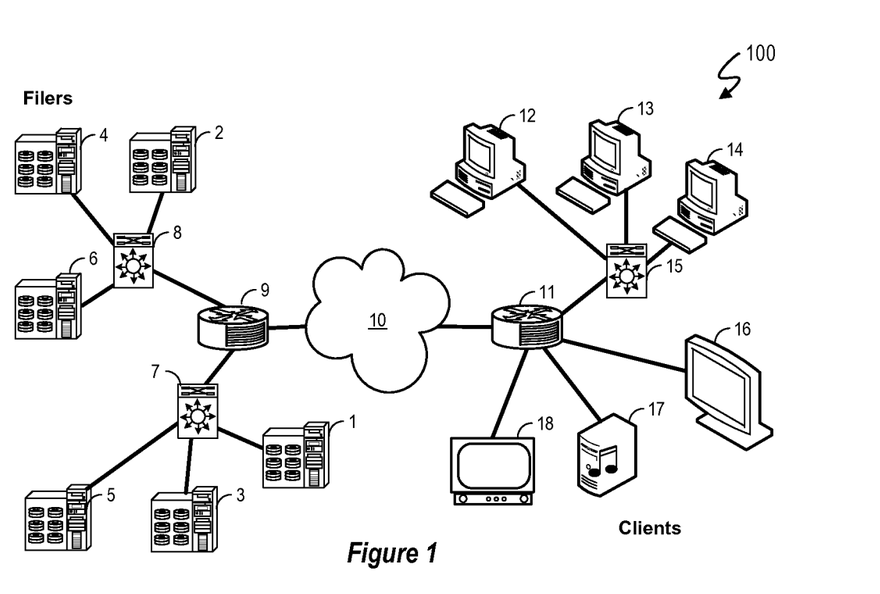
FIG. 1 depicts a typical NAS system in which client devices use a network to access storage resources on a number of remote network attached storage and file servers.

Data storage technology over the years has evolved from a direct attached storage model (DAS) to using remote computer storage models, such as Network Attached Storage (NAS) and a Storage Area Network (SAN). With the direct storage model, the storage is directly attached to the workstations and application servers, but this creates numerous difficulties with the administration, backup, compliance and maintenance of the directly stored data. These difficulties are alleviated at least in part by separating the application server/workstations from the storage medium. For example, FIG. 1 depicts a typical NAS system 100 in which a number of PCs, workstations and application servers (clients) use a network 10 to access storage resources on a number of remote network attached storage and file servers (or filers). In the depicted system 100, each of the networked PC or workstation devices 12-14 and application servers 16-18 may act as a storage client that is connected to the network 10 by the appropriate routers 11 and switches 15 to remotely store and retrieve data with one or more NAS filers 1-6, which in turn are connected to the network 10 by the appropriate routers 9 and switches 7-8. Typically, the storage clients (e.g., 14) use an IP-based network protocol, such as CIFS and NFS, to communicate store, retrieve and modify files on an NAS filer (e.g., 5).

Conventional NAS devices are designed with data storage hardware components (including a plurality of hard disk drives, one or more processors for controlling access to the disk drives, I/O controller and high speed cache memory) and operating system and other software that provides data storage and access functions. Even with a high speed internal cache memory, the access response time for NAS devices continues to be outpaced by the faster processor speeds in the client devices 12-14, 16-18, especially where any one NAS device may be connected to a plurality of client storage devices. In part, this performance problem is caused by the lower cache hit rates that result from a combination of increased disk capacity and high-density mounting on the NAS storage device.

While a number of solutions have been proposed to address these problems, they are, for a variety of reasons, not entirely satisfactory. For example, increases in the size and speed of the cache memory result in increased costs. And while faster disk drives have been developed, the increased disk drive access speeds are not enough to overcome the performance gap. Other solutions have proposed using performance-oriented data placement, but these have provided only limited performance gains. Attempts to increase response speed by using disk striping across multiple RAID disks have not proven to be scalable or have otherwise suffered from proprietary limitations. And while parallel file systems with virtualization have been able to provide short-term performance gains, they are massively complex and difficult to implement. Accordingly, there is a need for a system and method for improving the disk storage access time to overcome the problems in the art, such as outlined above. Further limitations and disadvantages of conventional solutions will become apparent to one of skill in the art after reviewing the remainder of the present application with reference to the drawings and detailed description which follow.

SUMMARY OF THE INVENTION

A high-performance, scalable, stand-alone intelligent cache appliance and methodology are provided for dynamically caching files by monitoring NFS and CIFS traffic between clients and NAS subsystems in response to clients that make read and write requests for these files. When positioned between the storage clients and the NAS filers, the intelligent cache appliance intercepts all requests between the clients and filers and provides read and write cache acceleration by storing and recalling frequently used information. By snooping network protocol traffic state parameters and splicing connections between filers and clients, the intelligent cache appliance provides Open System Interconnect (OSI) transparency, thereby performing in the Ethernet network as a bump-in-the-wire. In selected embodiments, a plurality of intelligent cache appliances may be clustered together to seamlessly scale the cache capacity by allowing devices to become part of a cohesive memory pool without user intervention, either by using a daisy-chain configuration to connect up to three cache appliances or by using a switched configuration to connect four or more cache appliances.

In accordance with various embodiments, a data operation (such as a request to read or write a file from a networked storage device) may be cached or serviced by an enterprise cache cluster of two or more cache appliances using packet inspection intelligence to splice connections under software control using the methodologies and/or apparatuses described herein which may be implemented with computer program code comprising computer executable instructions. In whatever form implemented, an enterprise cache cluster receives a request from a remote client to perform a specified data operation at one or more networked data storage devices. The enterprise cache cluster is configured to transparently splice connections between the remote client and the networked data storage devices, such as by splicing some, but not all, of all of the packet parameters in the TCP/IP stack so as to be transparent to the L3 and L4 network layers defining a connection between the remote client and the networked data storage device(s). For example, in a selected embodiment, the enterprise cache cluster splices only a connection state, a source sequence number and a destination sequence number in an L4 layer defining a connection between the remote client and the networked data storage device(s). In addition, the enterprise cache cluster inspects packet parameters in each TCP/IP stack layer associated with the request to determine if the request can be serviced by a cache memory located in one of the cache appliances in the enterprise cache cluster. If the request can not be serviced by the enterprise cache cluster, the request is forwarded to the one or more networked data storage devices for further processing. However, if the request can be serviced by the enterprise cache cluster, the specified data operation is performed by caching files at a selected cache memory located at the enterprise cache cluster in the cache memory located at the standalone cache unit by forwarding the request to the selected cache memory over a connection interface which connects the two or more cache appliances over a cluster bus in a private network to form a cohesive memory pool from the cache memories in the two or more cache appliances. In selected embodiments, the request is forwarded by sending the request to a first pair of 10G Ethernet ports at a first cache appliance that are directly connected to a second pair of 10 G Ethernet ports in a second cache appliance to form point-to-point connections for up to three cache appliances. In other embodiments, the request is forwarded by sending the request over a first cluster switch coupled to the one or more I/O ports of each cache appliance for forming a fully meshed network between the two or more cache appliances of the enterprise cache cluster. At the selected cache memory, a predetermined cache policy is used to perform the specified data operation by caching files identified in the request. In addition or in the alternative, the files may be cached in the enterprise cache cluster using dynamically adjustable cache policies that reflect application workloads that change over time.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and program are disclosed for accelerating data storage access by caching selected data in a scalable, stand-alone cluster of high-performance memory-based devices that transparently monitors NFS and CIFS traffic between clients and NAS subsystems and caches files using dynamically adjustable cache policies that reflect the business requirements and/or application workloads that change over time. In selected embodiments, one or more cache appliances may be connected or clustered together in front of an NAS filer (group) to provide low-latency access and redundancy in responding to both read and write requests for cached files, thereby improving access time to the data stored on the disk-based NAS filer (group). By providing a plurality of cache appliances that may be clustered together, the cache capacity may be seamlessly scaled by allowing devices to become part of a cohesive memory pool without user intervention, either by using a daisy-chain configuration to connect up to three cache appliances or by using a switched configuration to connect four or more cache appliances.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
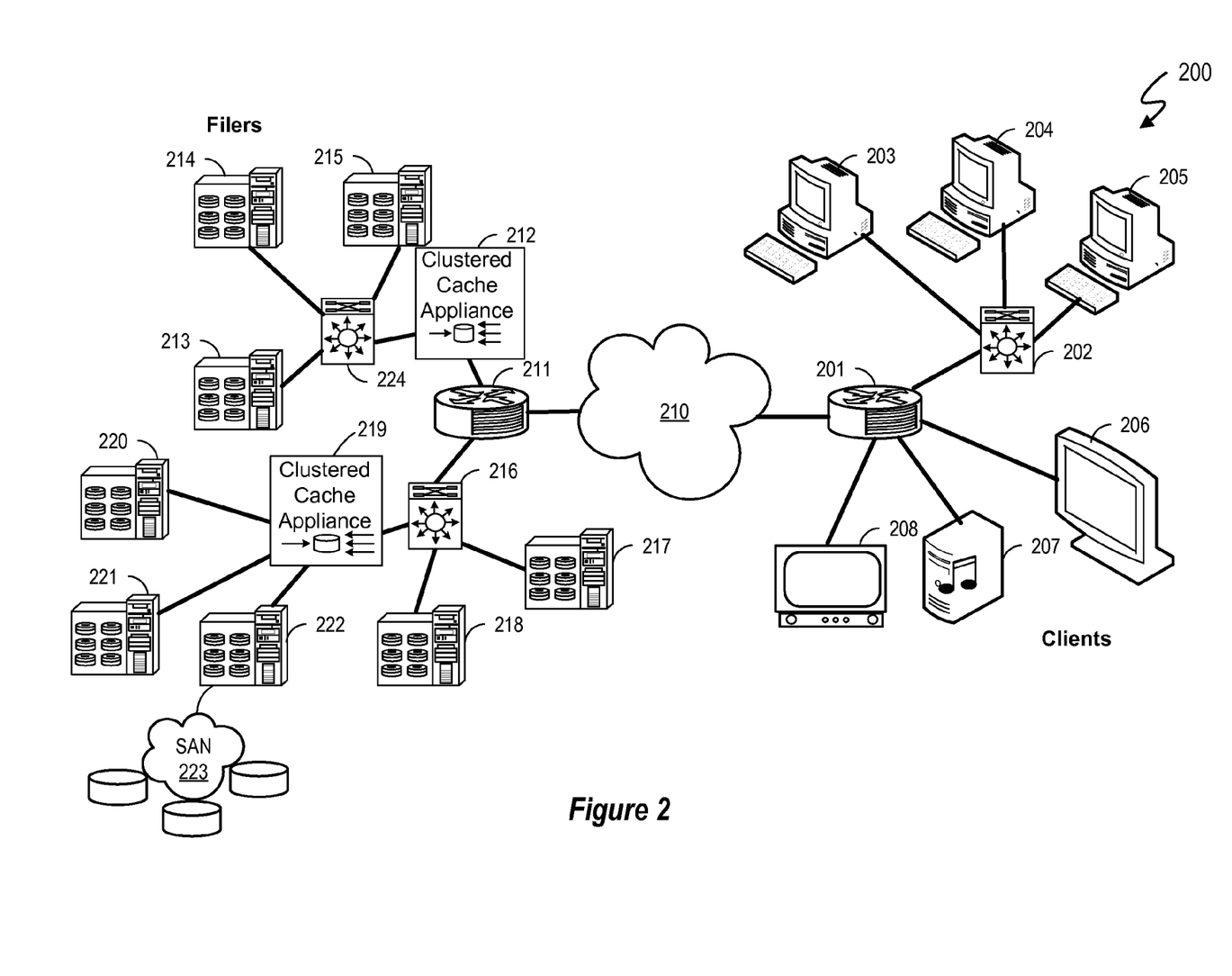
FIG. 2 depicts an enterprise storage network system in which one or more intelligent cache appliances may be located in front of a file server or a plurality of file servers.

Referring to FIG. 2, a diagram depicts an example enterprise storage network system 200 in which one or more intelligent cache appliances (e.g., 212, 219) may be located in front of a file server (e.g., 222) or a file server group (e.g., 213-215). The depicted storage network system 200 includes one or more storage clients, such as mobile or desktop PCs or workstations 203-205 or application servers 206-208. Each of the storage clients may run a separate application which requires access to remotely-stored application data. When the application data is stored in one of the NAS filers, the storage client sends a read or write request over the network 210 using the appropriate routers 201, 211 and/or switches 202, 216, 224. Such requests may be sent to the destination NAS filer using an appropriate IP-based network protocol, such as CIFS or NFS. However, when an intelligent cache appliance is installed in-line between the storage clients and a destination NAS filer, the request to read or write application data may be processed more quickly from the cache appliance's memory than would otherwise occur if the application data were processed from the disk arrays or cache memory in the NAS filer. In this description, a reference to a cache appliance (e.g.,. 212) may include one or more cache appliances that are connected or clustered together and working in tandem to form a single homogeneous caching device, as described more fully below. In addition, it will be appreciated that each cache appliance may be constructed as a high-speed packet processor with a substantial cache memory by including a set of network processing resources (such as a network switch and network processor(s)), a dynamic cache memory, a non-volatile cache memory and cache controller(s).

As indicated in FIG. 2, the intelligent cache appliances may be installed in a variety of different locations in the enterprise storage network 200 to provide the caching benefits to a one or more NAS filers (as shown by the placement of the cache appliance 219 in relation to NAS filers 220-222) or to a group of NAS filers (as shown by the placement of the cache appliance 212 in relation to the switched NAS filers 213-215). However positioned, the cache appliance operates to intercept all requests between the storage clients and the filers fronted by the cache appliance and provide read and write cache acceleration by storing and recalling frequently used information. Obviously, for this to occur, the cache appliance must be the only path that is able to reach the filers from the clients, and if any other path is available, cache coherency problems arise when a piece of information stored on the cluster is modified through an alternate path.

When provided with packet inspection capability, each cache appliance 212, 219 is able to inspect the packet information in each of the TCP/IP stack layers to determine the physical port information for the sender and receiver from the L2 datalink layer, the logical port information for the sender and receiver from the L3 network layer, the TCP/UDP protocol connection information from the L4 transport layer, and the NSF/CIFS storage protocol information from the L5 session layer. In addition, the packet inspection capability enables each cache appliance to be spliced seamlessly into the network so that it is transparent to the L3 and L4 layers and only impacts the storage requests by processing them for the purposes of accelerating them, i.e., as a bump-in-the-wire. Rather than splicing all of the connection parameters in the L2, L3 and L4 layers, each cache appliance splices only the connection state, source sequence number and destination sequence number in the L4 layer. By leaving unchanged the source and destination MAC addresses in the L2 layer, the source and destination IP addresses in the L3 layer and the source and destination port numbers in the L4 layer, a client perceives that it is communicating with the filer, and vice versa, and there is no awareness at either the client or filer of any intervening cache appliance. With this approach, the spliced connections between clients and filers are separated to meet the data needs of the client from the cache, while providing periodic updates to meet the connection timeout protocol requirements of the filer. In selected embodiments, a read or write request is processed at the cache appliance by making only layer 1 and layer 2 configuration changes during installation or deployment, and as a result, no filer or client configuration changes are required in order to take advantage of the cache. With this capability, an installed cache appliance provides a fast and transparent storage caching solution which allows the same connections to be maintained between clients and filers. And if there is a failure at the cache appliance, the cache appliance automatically becomes a wire between the client and filer who are able to communication directly without any reconfiguration.

Figure 3:
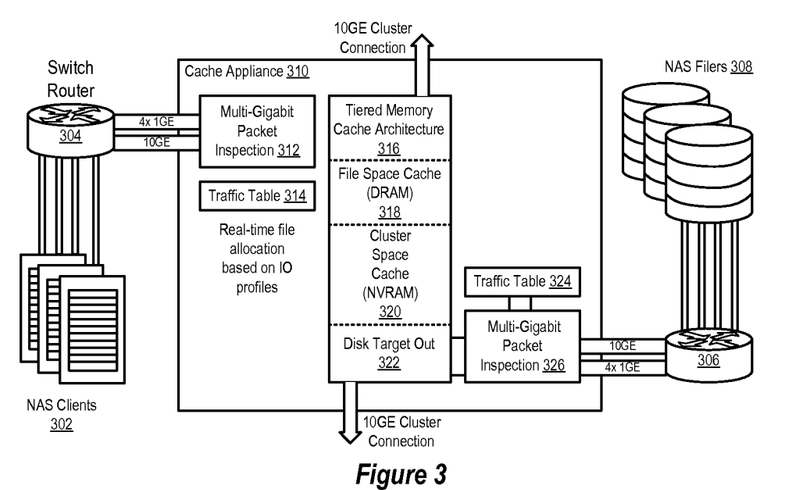
FIG. 3 depicts the functional operation of a non-disruptive storage cache appliance with packet inspection intelligence.

The functional operation of the packet inspection intelligence in the cache appliance may be described with reference to FIG. 3 which depicts the functional operation of a non-disruptive storage cache appliance 310 that is connected in-line between one or more NAS clients 302 and a switching router 304 (on the one hand) and one or more NAS filers 308 and a switching router 306. When a request to read or write application data is received from a storage client 302, the cache appliance 310 uses dedicated, high-speed packet inspection hardware 312 to inspect the packets of incoming requests to determine if they should be passed inward for further processing by the cache appliance 310 or forwarded to another destination, such as a NAS filer 308. For example, if the NAS client 302 requests application data that is stored on the cache appliance 310, the packet inspection hardware 312 may process the request by using an upstream traffic table 314 to perform real-time file allocation base on I/O profiles. If the packet inspection indicates that the request is to be processed by the cache appliance 310, the request is passed internally to the tiered memory cache system 316 which controls the cache storage into tiers. For example, tier 1 storage is reserved for the most critical data (including email, high transaction databases, business critical processes and line of business applications), while tier 0 storage refers to an in-band, network-resident, policy-driven, high-performance, scalable tier of memory subsystems that is used for the storage of business critical data under control of a policy engine that is managed independently from the one or more NAS filers. Within the tiered memory, a volatile or dynamic random access memory (DRAM) 318 provides a file space for caching application data, while a non-volatile random access memory (NVRAM) 320 provides a space for caching pending write operations to NAS filers for the purpose of maintaining data coherency in a failure event, such as network packets not arriving to their destination. If it is determined that the request can not be serviced by the cache appliance 310, the output module 322 outputs the client request the disk target in the destination NAS 308.

In similar fashion, when a response to a request to read or write application data is received from an NAS filer 308, the cache appliance 310 uses dedicated, high-speed packet inspection hardware 324 to inspect the packets of incoming responses to determine if they should be passed inward for further processing by the cache appliance 310 or forwarded to another destination. For example, if the NAS filer 308 returns application data in response to a read request, the packet inspection hardware 326 may process the response for possible caching at the cache appliance 310 by using a downstream traffic table 314 to perform real-time file allocation base on I/O profiles. If the packet inspection indicates that the request is to be processed by the cache appliance 310, the request is passed internally to the tiered memory cache system 316 which controls the cache storage into tiers.

Figure 4:
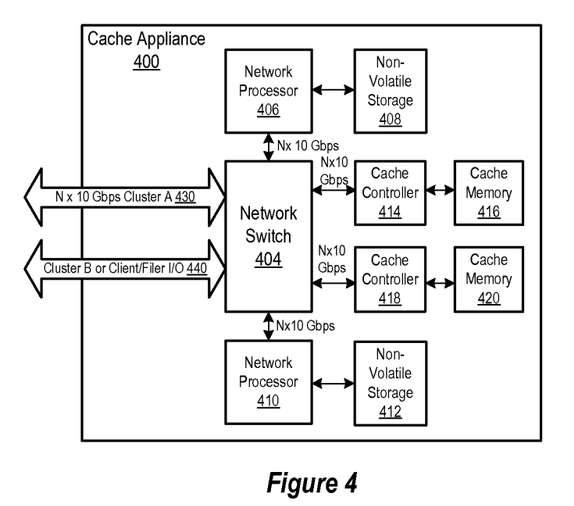
FIG. 4 is a block diagram of a cache appliance which may be used in connection with selected embodiments of the present invention.

As described herein, the cache appliance is the fundamental element of the data storage cache system, and is implemented as a combination of a high-speed packet processor and a large cache memory. While a variety of different architectures may be used to implement the cache appliance, FIG. 4 depicts in block diagram form an example hardware implementation of a cache appliance 400 which may be used in connection with selected embodiments of the present invention to provide network interfaces, packet processing and cache memory. To provide these functions, the cache appliance 400 includes a network switch interconnect component for routing network traffic, a network processor component for packet processing, and a cache controller and cache memory component for storing cached data files.

The central element of the cache appliance hardware 400 is a high-speed network switch 404. The network switch 404 provides client and filer interfaces, 10 Gbps cluster interfaces, and multiple 10 Gbps connections to the packet processing and cache controller hardware. The network switch 404 manages data flow between the I/O ports 430, 440 and the packet processing and cache controller hardware, and may be optimized for network traffic where it is desirable to obtain extremely low latency. The network switch 404 may be configured to concurrently accommodate a large number of independent accesses that are processed on each clock cycle, and enables communication data requests from network processor hardware to the cache hardware, as well as data responses from cache hardware to the network processor hardware. In one embodiment, network switch 404 includes logic (such as multiplexers or a switch fabric, for example) that allows any network processor to access any cache memory, and that conversely allows data to be returned from any cache memory to any network processor. Network switch 404 may also include logic to queue data requests and/or responses, such that requests and responses may not block other activity while waiting for service, and may be configured to arbitrate cache access conflicts.

The cache appliance hardware 400 also includes one or more network processor units (NPUs) which run the core software on the device to perform node management, cluster communication, packet processing, cache management, and client/filer communication. In a selected embodiment, two NPUs 406, 410 are provided, where each NPU may be implemented as a multi-threaded multi-core processor. To assist with device operation, each NPU 406, 410 controls a durable or non-volatile cache memory 408, 412, respectively. With the non-volatile cache memory units 408, 412, a very large amount of durable memory (e.g., 128 Gigabyte) may be provided for caching device operation software or data, such as with a field replaceable solid state drive (SSD) or hard disk drive (HDD) memory.

Finally, the cache appliance hardware 400 includes a substantial cache memory for storing data files. To control the cache memory, the cache appliance hardware 400 includes a cache controller for each cache memory. In a selected embodiment, two cache controllers 414, 418 are provided, respectively for each volatile cache memory 416, 420. With the volatile cache memory units 416, 420, a substantial amount of dynamic random access memory (DRAM) (e.g., 64 Gigabyte) may be provided. Each cache controller 414, 418 is responsible for connecting both the dynamic cache memory and the non-volatile storage to the high-speed interconnect within the cache appliance. In addition, the cache controllers 414, 418 may offload some cache memory lookup and coherency functions from the network processors 406, 410.

To increase the caching capacity and performance of the data storage cache system, a cache appliance may be connected or clustered with one or more additional cache appliances on a private network so that the appliances work in tandem to form a single homogeneous caching device. As described above, each cache appliance 400 contains a set of network processing resources, dynamic storage, and non-volatile storage that are combined as a pool of resources which may be treated as a node on the network. To this end, each cache appliance 400 includes I/O ports 430, 440 that allow the cache appliance 400 to be connected to another cache appliance.

Figure 5:
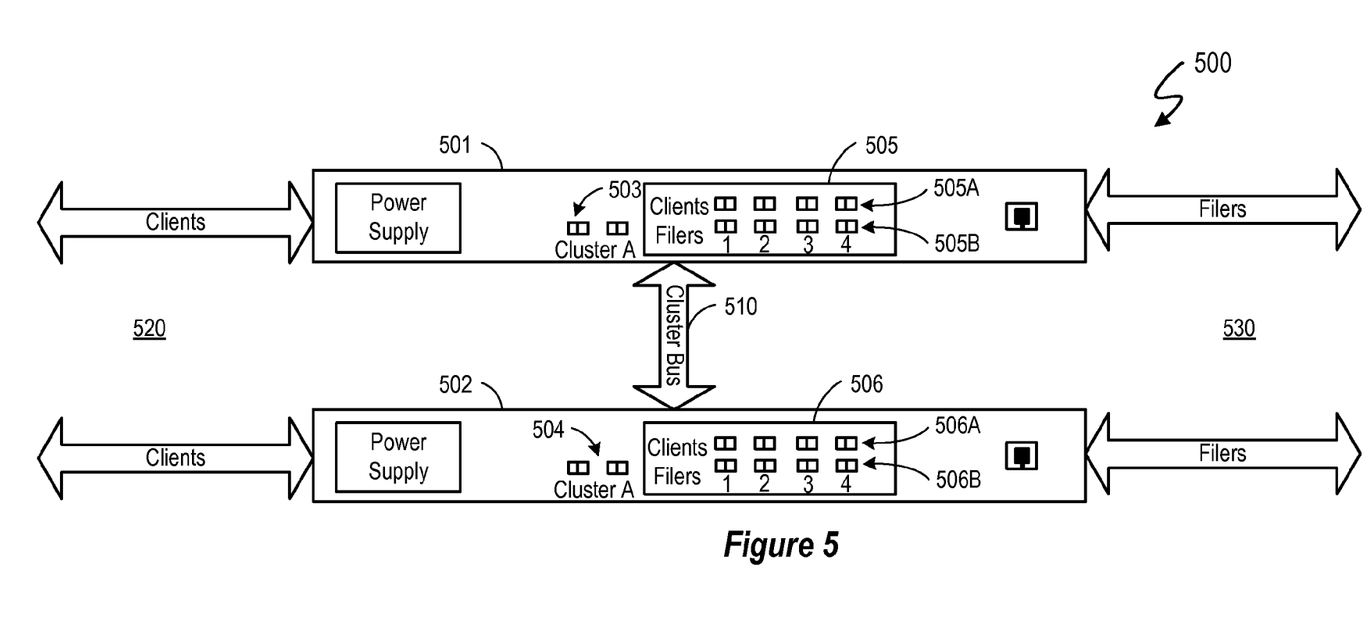
FIG. 5 depicts a first connection configuration for connecting up to three cache appliances in a daisy-chain topology.

In a first example connection configuration, a plurality of cache appliances (e.g., up to three appliances) may be physically connected in a point-to-point connection configuration using a pair of high-speed Ethernet ports. FIG. 5 depicts an example connection configuration for a two node cluster 500 in which two cache appliances 501, 502 are connected in a daisy-chain topology. As illustrated, the first cache appliance 501 has a first plurality of I/O ports 503 (e.g., two 10 G Ethernet ports) and a second plurality of I/O ports 505 (e.g., eight 1 G Ethernet ports). Likewise, the second cache appliance 502 has a first plurality of I/O ports 504 (e.g., two 10 G Ethernet ports) and a second plurality of I/O ports 506 (e.g., eight 1 G Ethernet ports). By directly connecting the first plurality of I/O ports, a cluster bus 510 is formed between the cache appliances 501, 502. In addition, the second plurality of I/O ports may be used to connect the cache appliances 501, 502 to the filers 530 and clients 520. Since the cluster 500 performs as a bump-in-the-wire to connect a particular filer 530 to a particular client 520, the second plurality of I/O ports 505, 506 on each appliance may be paired together. Thus, the second plurality of I/O ports 505 on the first appliance 501 includes client I/O ports 505A and corresponding filer I/O ports 505B. Likewise, the second plurality of I/O ports 506 on the second appliance 502 includes client I/O ports 506A and corresponding filer I/O ports 506B. With this arrangement, the cluster 500 may be installed in a network by breaking a pre-existing network segment in two and then connecting one side to the client I/O port (e.g., 505A) in the pair and the other side connected to the filer I/O port (e.g., 505B) in the pair.

Figure 6:
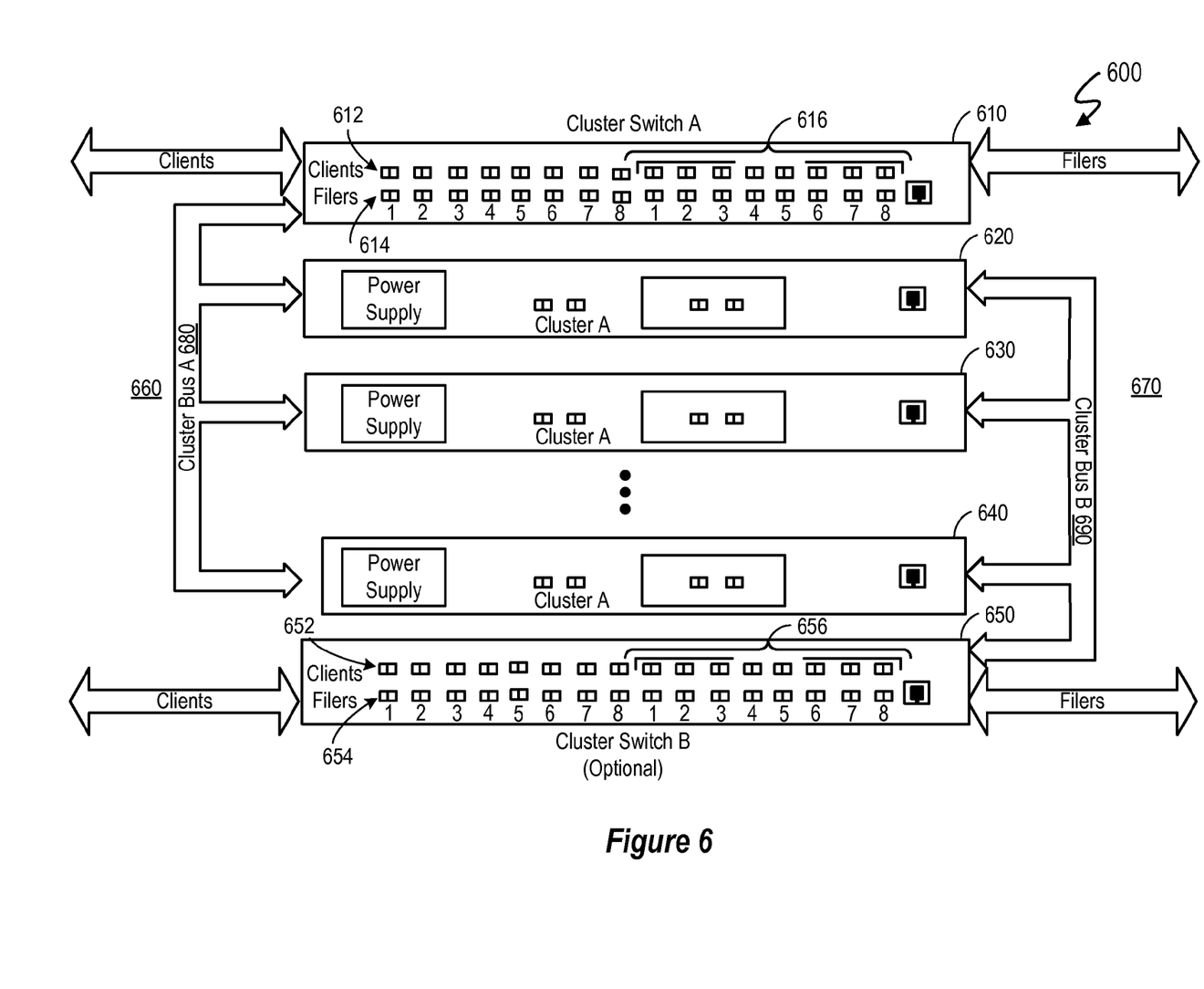
FIG. 6 depicts a second connection configuration for connecting a plurality of cache appliances in a star topology.

In another example connection configuration depicted in FIG. 6, a plurality of cache appliances 620, 630, 640 may be physically connected in a star topology configuration using one or more cluster switches 610, 650 to form a multi-node cluster 600. As disclosed herein, the cluster switch 610 manages the connections to the clients 660 and filers 670 and also provides IPC connectivity between the cache appliances 620, 630, 640. By connecting a first cluster switch 610 to I/O ports on each of the cache appliances 620, 630, 640, a fully meshed network is formed between the cache appliance nodes 620, 630, 640 in the cluster 600. The cluster switch 610 may be connected to communicate with the clients 660 and filers 670 without any hardware limit on the number of cache appliances that can be connected, so any number of cache appliances can be connected up to the supported maximum. In the example configuration shown in FIG. 6, the cluster switch 610 at the top of the cluster 600 provides paired port connections between the clients 660 and filers 670 by including client I/O ports 612 and corresponding filer I/O ports 614. In addition, the cluster switch 610 provides I/O ports 616 (e.g., 10 G ports) for connecting with the cache appliances 620, 630, 640 over a cluster bus 680. In this configuration, each of the cache appliances 620, 630, 640 is connected to the cluster switch 610 via a pair of point-to-point 10 G Ethernet connections. These connections form the cluster bus 680 which is used to transport filer and client packets from the cluster switch 610 to the cache appliance/nodes, and to transport all intra-node operations and control traffic.

Figure 7:
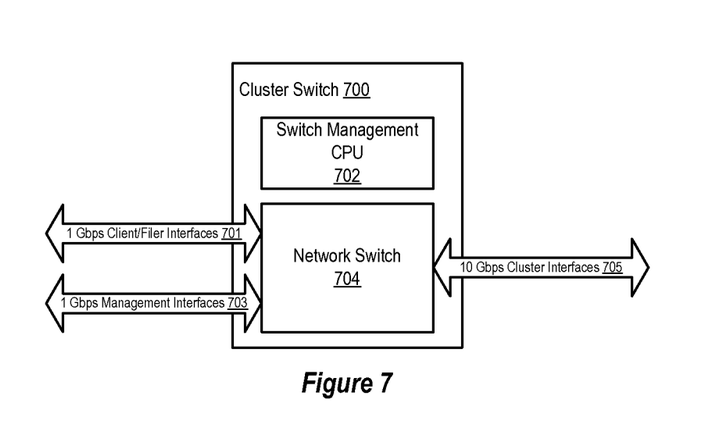
FIG. 7 is a block diagram of a cluster switch which may be used in connection with selected embodiments of the present invention.

While a variety of different architectures may be used to implement the cluster switch, FIG. 7 depicts in block diagram form an example hardware implementation of a cluster switch 700 which may be used to provide the point-to-point cluster interconnect between cache appliance nodes in connection with selected embodiments of the present invention. In support of these interconnections, the cluster switch 700 includes a switch management processing unit or controller 702 and a 10 Gbps network switch 704. The network switch 704 provides a first plurality of I/O interfaces 701 (e.g., multiple 1 Gbps interfaces) for client and filer connections, and also provides a second plurality of interfaces 705 (e.g., 10 Gbps interfaces) for cluster connections. The network switch 704 may also include a management interface 703. The cluster switch 700 also includes a switch management processing unit 702 which provides in-band switch management for managing the cluster switch 700 by serving as a master node in the cluster (e.g., cluster 600 shown in FIG. 6) to control load balancing, port assignment, and write cache redundancy.

As described thus far with reference to FIG. 6, a single cluster switch 610 may be used to connect a plurality of cache appliances into a cluster. However, in selected embodiments, an additional cluster switch 650 may also be used to cluster the cache appliances 620, 630, 640. As depicted, the optional cluster switch 650 at the bottom of the cluster 600 provides paired port connections between the clients 660 and filers 670 by including client I/O ports 652 and corresponding filer I/O ports 654. In addition, the cluster switch 650 provides I/O ports 656 (e.g., 10 G ports) for connecting with the cache appliances 620, 630, 640 over a cluster bus 690. In this configuration, each of the cache appliances 620, 630, 640 is connected to the cluster switch 650 via a pair of point-to-point 10 G Ethernet connections. These connections form the cluster bus 690 which is used to transport filer and client packets from the cluster switch 650 to the cache appliance/nodes, and to transport all intra-node operations and control traffic. When present, the second cluster switch 650 provides a redundant set of filer and client interfaces for high availability deployments, and also increases the performance of the entire cluster 6090 by doubling the cluster bus bandwidth.

Figure 8:
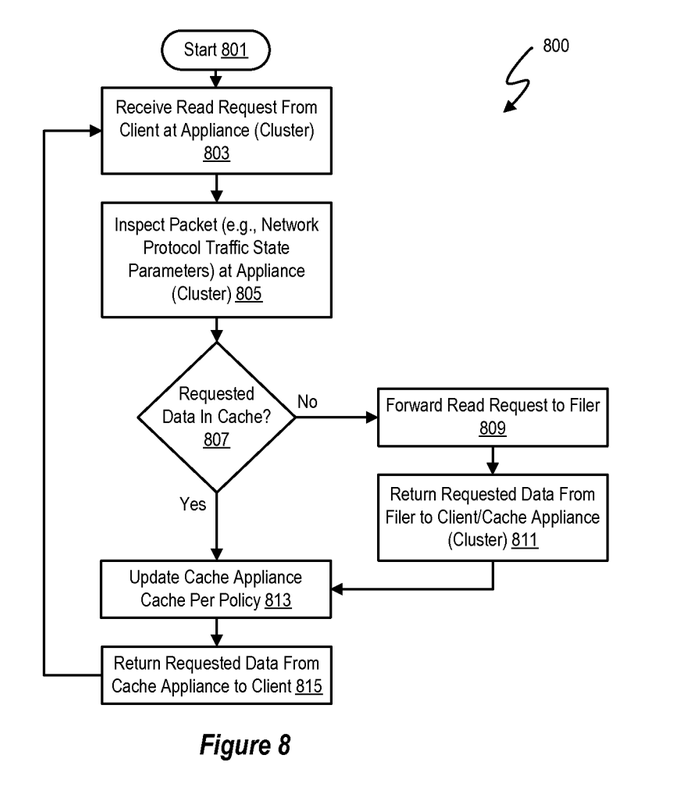
FIG. 8 depicts an example process flow sequence for caching storage data using spliced connections.

Turning now to FIG. 8, there is depicted an example process flow 800 for caching storage data at a cache appliance using spliced connections. The process starts (step 801), such as when a cache appliance is positioned between the storage clients and the NAS filers. In operation, the cache appliance operates to intercept all requests between the clients and filers and provide read and write cache acceleration by storing and recalling frequently used information. After receiving a read request from a client (step 803), the cache appliance (cluster) inspects the packet information associated with the request (step 805) to obtain information for moving the packet through the system (e.g., network protocol traffic state parameters). The inspected information is used to identify packets that need to be processed by the cache appliance, as well as packets that are to be forwarded by the cache appliance. By snooping network protocol traffic state parameters and splicing connections between filers and clients, the cache appliance provides Open System Interconnect (OSI) transparency, thereby performing in the Ethernet network as a bump-in-the-wire. Based on the inspected information, the cache appliance checks to see if the requested data is present within the appliance's cache memory. If so (affirmative outcome to decision 807), this is considered a read cache-hit and the request is satisfied directly from the appliance's cache memory (step 815) before or after updating the cache memory pursuant to the cache replacement policy (step 813). Otherwise, this is a read cache-miss (negative outcome to decision 807) and the cache appliance forwards the read request to the filer (step 809). The data returned by the filer may be sent to the client and/or cached in one or more cache blocks in the cache memory of the cache appliance (cluster) (step 811) so that the read request can be satisfied from the cache appliance (step 813). Either before or after the read request is returned to the client, the cache appliance (cluster) promotes the cache block based on the cache replacement algorithm (step 815). Any desired cache population algorithm for page replacement and cache eviction may be used to populate the cache memory in the cache appliance, including, for example, a least recently used (LRU) algorithm (e.g., LRU-K or LRU-2), a least frequently used (LFU), a least recently/frequently-used (LFRU) algorithm, an adaptive replacement cache (ARC) algorithm, a multiqueue (MQ) replacement algorithm, the 2Q algorithm which uses two queues to separate hot and cold items, a low inter-reference recency set (LIRS) algorithm.

Figure 9:
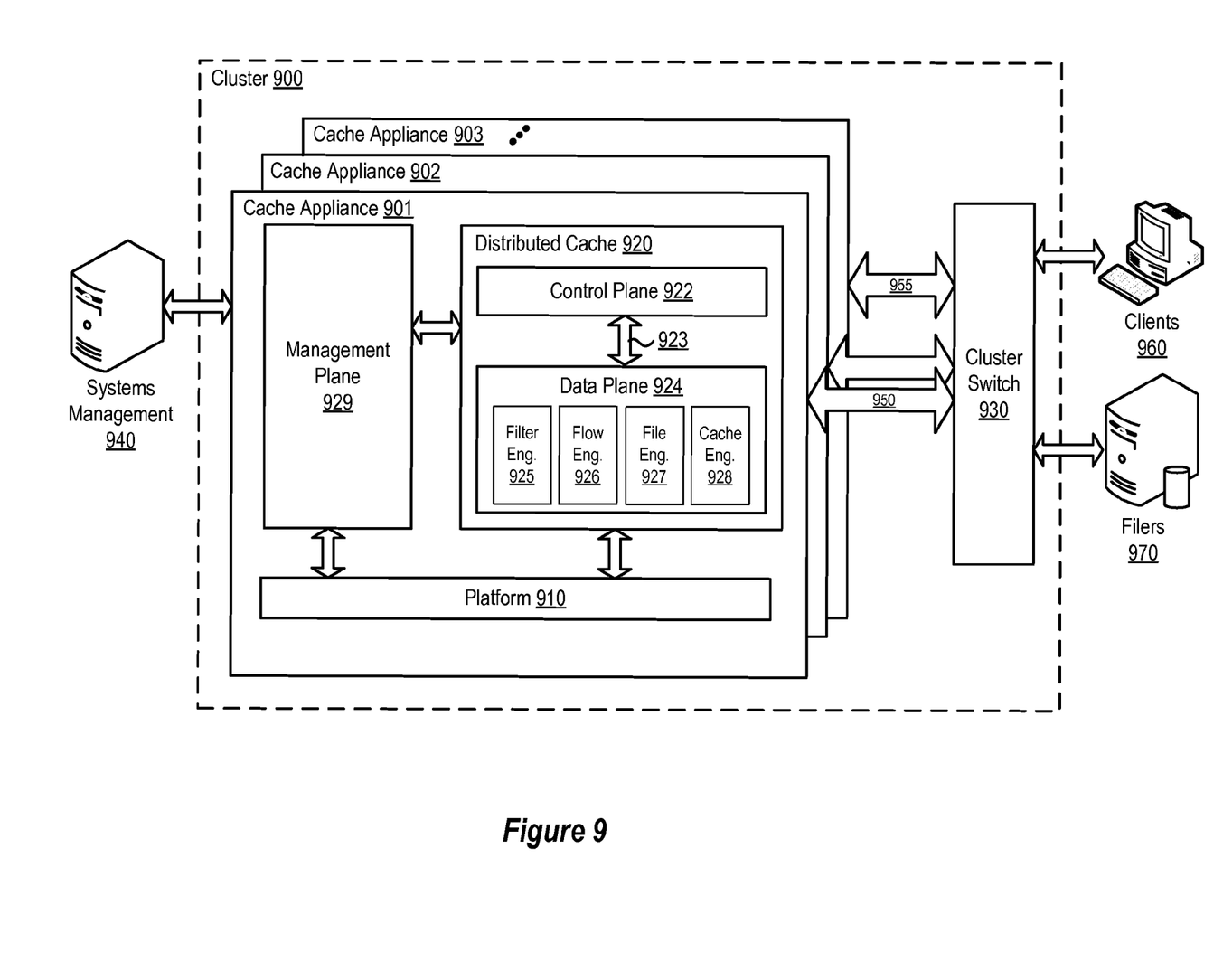
FIG. 9 depicts the overall system architecture of a non-disruptive storage cache appliance cluster.

To illustrate the constituent component functionality of the clustered cache appliances connected by a cluster switch, reference is made to FIG. 9 which depicts the overall system architecture of a non-disruptive storage cache appliance cluster. The depicted architecture is divided into four logical components, including the platform component 910, the distributed cache component(s) 920, the cluster switch component 930 and the systems management component 940.

The platform component 910 includes the hardware and system software components that come together to form the basis of the system. As described hereinabove, the hardware in the platform component 910 includes the individual cache appliance (described above with reference to FIG. 4) which provides network interfaces, packet processing, and cache memory. In addition, the hardware in the platform component 910 includes the cluster switch (described above with reference to FIG. 7) which provides high-speed point-to-point (star-topology) interconnect between cluster nodes for load balancing, write cache redundancy, and management. The software in the platform component 910 includes a boot loader component (for bringing the appliance to a minimal operating state), an operating system component (to provide for process scheduling, memory allocation, network, and flash file system facilities) and drivers (for extending the OS functionality and provide access to required hardware).

The distributed cache component(s) 920 include the embedded software that runs on the cache appliances to implement the caching functionality amongst the nodes 901-903 of the cluster. By having each node in the cluster hosts a part of a distributed memory cache, servicing of the I/O requests is accelerated. When the distributed cache component 920 is architected as a shared-nothing system, every piece of file data within the cluster is found in one and only one memory location and the data is in no way replicated in the system.

As illustrated, the distributed cache component software 920 includes a data plane section 924 which performs the required packet processing functions on a packet so that each packet can progress through the cluster 900. In other words, if something must be performed to progress a packet through the system, then it is a data plane activity. The data plane 924 processes received client and filer traffic through a pipeline of operations. At any point during the processing, the data plane 924 may forward a packet out from the distributed cache component 920 because it is finished servicing the operation, or the packet is not pertinent to the system, or for other reasons. The data plane 924 may also use a cluster interface to forward the packet to another node in the cluster 900.

The distributed cache component software 920 also includes a control plane section 922 which performs the required processing functions about a packet to facilitate the data plane or that is not required in order to process a packet. In other words, the control plane section 922 stores control information that affects the data plane 924. If any stimulus outside of a packet traversing the system requires an operation, then it is a control plane activity. The control plane 922 is composed of stand-alone data structures as well as a set of managers that themselves may contain their own data structures. The interaction between the control plane 922 and the data plane 924 is via the interface 923 which can be take several forms, such as function calls, IPC requests, or direct access into a data structure's memory. As packets progress through the system, the data plane 924 queries the control plane 922 to help it perform its operations. The data plane 924 conversely sends information to the control plane 922 that it may either need in subsequent operations or that provide information to the management functions of the system. In addition, the distributed cache component software 920 includes a management plane section 929 which performs various ancillary functions on the system that do not affect the processing of packets or that is on demand from the remote management server 940.

The cluster switch component 930 includes the hardware and software that manages the connections to the clients 960 and filers 970, as well as providing IPC connectivity between the cache appliances 901-903. As illustrated above in FIG. 7, the cluster switch component 930 provides the point-to-point cluster interconnect between cache appliance nodes 901-903, provides one or more 10 Gbps interfaces for cluster connections, and provides one or more multiple 1 Gbps interfaces for client and filer connections, as well as an optional management interface.

Finally, the systems management component 940 is the software running on a remote management server that facilitates all fault, configuration, accounting, performance, and system tasks performed on the cluster. The systems management component 940 enables a user to define, configure and/or modify a cache policy for the cluster 900 to accelerate the performance of a cluster 900. In addition, the systems management component 940 enables specific cache policy configurations to be specified for individual applications. The configuration that specifies how to cache a particular application is the application cache profile. Once the application cache profiles have been defined, they can be scheduled with the systems management component 940 to specify the window of time where the application's policy statements will be valid. If an application is not scheduled, it is considered disabled. If two or more applications overlap, a priority can be assigned to control which application takes precedence.

In operation, the data plane 924 includes a packet filter engine 925 that inspects received packets to identify the packets that need to be processed by the cluster 900, and forwards all other packets to an exit interface 950, 955. This action minimizes the impact of non-relevant packets on system resources. There are two types of packets that must be identified for further processing: cluster IPC packets and client/filer packets. Cluster IPC packets are identified based on L2 headers and knowledge of how such packets are formatted (e.g., custom Ethernet types). Client/filer packets are identified based on L2-L4 headers and queries to the port map manager which contains information about the UDP/TCP ports being used by the filers to provide storage services (NFS, CIFS, etc.). The information gleaned from L2-L4 parsing is saved in the packet context to avoid having to parse these headers again in other components.

The data plane 924 also includes a flow engine 926 to process TCP connections and UDP conversations by providing a place to store flow context and to implement split TCP connections and flow serialization, where a flow refers to a sequence of TCP or UDP packets having with the same 5-tuple. The flow engine provides a mechanism for other modules to store flow-specific data for later retrieval. For example, the NFS module may store data related to an NFS request to match with an ensuing NFS reply. Another primary example is TCP connection state for tracking sequence numbers, retransmits, etc. As from implementing split TCP connections, this occurs when the cluster 900 becomes a man-in-the-middle on a connection when a request (e.g., an NFS read) is intercepted and served from local cache. The flow manager implements the logic needed to be a man-in-the-middle on a split connection.

A file engine 927 in the data plane 924 handles layer 5-7 NFS, mount, CIFS, HTTP, FTP, and port mapper transactions that are used to perform protocol decode, file lookup, and transaction processing operations. In protocol decode operations, the protocol messages are delineated and decoded based on a protocol content type that is determined by the flow engine. After decode, a file lookup operation is performed using a reverse lookup of the internal file record based on filer and a protocol-specific file reference. This provides the file-specific information needed to process the message (e.g., internal file handle, cache policy, etc). In transaction processing operations, the requests are tracked and correlated with corresponding responses as part of a transaction pair between a client request and filer response, and based on the transaction type, the completed transaction pairs are routed to the appropriate component for further processing. For example, client requests for cacheable objects are intercepted and passed to the appropriate component (data requests to the cache engine), and all the information necessary to complete the transaction is passed on (packet, packet context, file record, request, etc.).

Finally, the data plane 924 includes a cache engine 928 that provides fault-tolerant block-level file caching. File requests are translated into distributed cache block accesses. A cache block is a unit of memory that is dedicated to storing file data. The blocks reside within the distributed memory that is implemented on top of the cluster of nodes 901-903. Even though NAS protocols are file-based, cache management may be simplified by superimposing a block approach. The cache engine 928 hides the distributed nature of the cache, providing file-based I/O to the control plane 922.

By clustering cache appliances together, the size of the cache memory for a filer system may be scaled and data content may be distributed across multiple cache appliances without user intervention or service interruption. Clustering also provides increased IOPS performance for a network-connected storage network. In addition, the packet inspection capability enables connection splicing so that the cache appliance (cluster) can be inserted between filers and filer's clients or users without having to change mount points and network addresses, implementation data migration and network topology. By momentarily interrupting the logical network connection between filers and its clients, the cache appliance may be installed along with one more network switches may be installed in the physical path. Once the cache appliance (cluster) is installed, it commences operation by identifying active network connections traveling along the physical path between the filers and filer's client(s).

By now it should be appreciated that there has been provided a method and system for caching data operations in an enterprise cache cluster of two or more cache appliances, where the data operations are requested from one or more networked data storage devices by one or more remote clients. As disclosed, the enterprise cache cluster includes a cache memory at each cache appliance for caching data that is requested by a remote client. The enterprise cache cluster also includes a packet processor at each cache appliance that is coupled to the cache memory in each appliance and to one or more I/O ports for splicing connections between the data storage devices and remote clients, where the packet processor inspects network protocol traffic state parameters received on the I/O ports to determine if a request from a remote client can be serviced by the enterprise cache cluster. In selected embodiments, the packet processor executes software that transparently monitors NFS and CIFS traffic between remote clients and NAS subsystems and caches files using a predetermined cache policy. In addition, the enterprise cache cluster includes a connection interface for connecting the cache appliances over a cluster bus in a private network to form a cohesive memory pool from the cache memories in the two or more cache appliances. The connection interface may be implemented as a first pair of 10 G Ethernet ports at a first cache appliance that are directly connected to a second pair of 10 G Ethernet ports in a second cache appliance to form point-to-point connections for up to three cache appliances. Alternatively, the connection interface may be implemented as a first cluster switch coupled to the one or more I/O ports of each cache appliance for forming a fully meshed network between the two or more cache appliances of the enterprise cache cluster, where the first cluster switch provides port pairs between the networked data storage devices and the remote clients. With the cluster switch embodiments, the connection interface can be implemented as a first pair of 10 G Ethernet ports at each cache appliance for directly connecting each cache appliance to the first cluster switch. Alternatively, the cluster switch embodiments may implement the connection interface as a second cluster switch coupled to the I/O ports of each cache appliance for forming a fully meshed network between the two or more cache appliances of the enterprise cache cluster (where the second cluster switch provides port pairs between the networked data storage devices and the remote clients), in which case the connection interface may include a second pair of 10 G Ethernet ports at each cache appliance for directly connecting each cache appliance to the second cluster switch. In selected embodiments, the enterprise cache cluster also includes a network switch interconnect at each cache appliance that is coupled between the one or more I/O ports, the packet processor and the cache memory for routing network protocol traffic from the data storage devices and remote clients, and that routes network protocol traffic from the data storage devices and remote clients. Finally, a distributed cache software module may be included in the enterprise cache cluster for distributing caching operations amongst the two or more cache appliances to thereby service I/O requests presented to the enterprise cache cluster from the one or more remote clients.

In another form, there is provided a method and system for non-disruptive storage caching using clustered cache appliances with packet inspection intelligence. As disclosed, a network cache appliance cluster is provided for accelerating read and write requests from one or more storage clients for one or more files residing at one or more networked storage devices. The network cache appliance cluster includes a plurality of cache appliances and a cluster switch for connecting the plurality of cache appliances in a private network to form a cohesive memory pool from the cache memories in the plurality of cache appliances. Each cache appliance includes a tiered memory cache system for providing low-latency access in responding to read and write requests comprising a first cache storage for storing business critical data under control of a policy engine that is managed independently from the one or more networked storage devices. In selected embodiments, the tiered memory cache system is implemented as a dynamic and non-volatile cache memory for providing low-latency access in responding to read and write requests, and a cache controller for caching files in the cache memory using a predetermined cache policy. Each cache appliance also includes a packet inspection module for inspecting a read or write request sent using an IP-based network protocol to determine if the request should be passed to the tiered memory cache system or forwarded to a networked storage device for further processing. In selected embodiments, the cluster switch is implemented as a switch management processor and a network switch interconnect coupled to one or more I/O ports on each of the plurality of cache appliances for routing network protocol traffic between the plurality of cache appliances and one or more storage clients and the one or more networked storage devices.

As will be appreciated by one skilled in the art, the present invention may be embodied in whole or in part as a method, system, or computer program product. For example, a computer-usable medium embodying computer program code may be used, where the computer program code comprises computer executable instructions configured to provide non-disruptive storage caching using clustered cache appliances with packet inspection intelligence. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A cache cluster of a plurality of cache appliances for caching data operations requested from one or more networked data storage devices by one or more remote clients, the cache cluster comprising:
   a cache memory at each cache appliance for caching data that is requested by a remote client;
   a packet processor at each cache appliance coupled to the cache memory in each cache appliance and to one or more I/O ports for splicing connections between the data storage devices and remote clients, where the packet processor inspects network protocol traffic state parameters received on the I/O ports to determine if a request from a remote client can be serviced by the cache cluster and splicing connections comprises splicing only a connection state, a source sequence number and a destination sequence number in a L4 layer; and
   a connection interface for connecting the plurality of cache appliances to form a cohesive memory pool from the cache memories in the cache appliances.

2. The cache cluster of claim 1, where the connection interface comprises one or more 10 G Ethernet ports at a first cache appliance that are directly connected to one or more 10 G Ethernet ports in a second cache appliance or a cluster switch.

3. The cache cluster of claim 1, where the connection interface comprises a first cluster switch coupled to the one or more I/O ports of each cache appliance for forming a fully meshed network between the cache appliances of the cache cluster, where the first cluster switch provides port pairs between the one or more networked data storage devices and the remote clients.

4. The cache cluster of claim 3, where each cache appliance comprises one or more 10 G Ethernet ports for directly connecting each cache appliance to the first cluster switch.

5. The cache cluster of claim 3, where the connection interface comprises a second cluster switch coupled to the one or more I/O ports of each cache appliance for forming a fully meshed network between the cache appliances of the cache cluster, where the second cluster switch provides port pairs between the one or more networked data storage devices and the remote clients.

6. The cache cluster of claim 5, where the connection interface comprises one or more 10 G Ethernet ports at each cache appliance for directly connecting each cache appliance to the second cluster switch.

7. The cache cluster of claim 1, further comprising a network switch interconnect at each cache appliance that is coupled between the one or more I/O ports, the packet processor and the cache memory for routing network protocol traffic from the data storage devices and remote clients.

8. The cache cluster of claim 1, further comprising a network switch interconnect at each cache appliance that is coupled to the connection interface for routing network protocol traffic from the data storage devices and remote clients.

9. The cache cluster of claim 1, where the packet processor at each cache appliance executes software that transparently monitors NFS and CIFS traffic between remote clients and NAS subsystems and caches files using a predetermined cache policy.

10. The cache cluster of claim 1, further comprising a distributed cache software module for distributing caching operations amongst the cache appliances to thereby service I/O requests presented to the cache cluster from the one or more remote clients.

11. The cache cluster of claim 1, where the cache cluster is connected in-line between the remote clients and the one or more networked data storage devices so as to intercept all data operation requests submitted to the one or more networked data storage devices.

12. A method for caching data operations at a cache cluster of two or more cache appliances, comprising:
    receiving, at the cache cluster, a request from a remote client to perform a specified data operation at one or more networked data storage devices;
    inspecting packet parameters in each TCP/IP stack layer associated with the request to determine if the request can be serviced by a cache memory located in one of the cache appliances in the cache cluster;
    forwarding the request to the one or more networked data storage devices when the request cannot be serviced by the cache cluster; and
    performing the specified data operation at a selected cache memory located at the cache cluster when the request can be serviced by the cache cluster by splicing connections between the remote client and the one or more networked data storage devices, where splicing connections comprises splicing only a connection state, a source sequence number and a destination sequence number in a L4 layer.

13. The method of claim 12 where forwarding the request to the selected cache memory over a connection interface comprises sending the request to one or more 10 G Ethernet ports at a first cache appliance that are directly connected to one or more 10 G Ethernet ports in a second cache appliance or a cluster switch.

14. The method of claim 12 where forwarding the request to the selected cache memory over a connection interface comprises sending the request over a first cluster switch coupled to the one or more I/O ports of each cache appliance for forming a fully meshed network between the two or more cache appliances of the cache cluster.

15. The method of claim 12, further comprising transparently splicing connections between the remote client and the one or more networked data storage devices.

16. The method of claim 12, where performing the specified data operation at the cache memory comprises caching files in the selected cache memory using a predetermined cache policy.

17. The method of claim 12, further comprising caching files in the cache cluster using dynamically adjustable cache policies that reflect application workloads that change over time.

18. A network cache appliance cluster for accelerating read and write requests from one or more storage clients for one or more files residing at one or more networked storage devices, comprising:
    a plurality of cache appliances, each comprising:
        a tiered memory cache system for providing low-latency access in responding to read and write requests comprising a first cache storage for storing business critical data under control of a policy engine that is managed independently from the one or more networked storage devices, and
        a packet inspection module for (i) inspecting a read or write request sent using an IP-based network protocol to determine if the request should be passed to the tiered memory cache system or forwarded to a networked storage device for further processing and (ii) splicing connections between the one or more storage clients and the one or more networked storage devices, where splicing connections comprises splicing only a connection state, a source sequence number and a destination sequence number in a L4 layer; and
    a cluster switch for connecting the plurality of cache appliances into a cohesive memory pool from cache memories in the plurality of cache appliances.

19. The network cache appliance cluster of claim 18, where each tiered memory cache system comprises:
    a dynamic cache memory and a non-volatile cache memory for providing low-latency access in responding to read and write requests; and
    a cache controller for caching files in the non-volatile cache memory using a predetermined cache policy.

20. The network cache appliance cluster of claim 18, where the cluster switch comprises:
    a switch management processor; and
    a network switch interconnect coupled to one or more I/O ports on each of the plurality of cache appliances for routing network protocol traffic between the plurality of cache appliances and one or more storage clients and the one or more networked storage devices.

* * * * *